H. J. CRINER.
HOG OILER.
APPLICATION FILED JUNE 2, 1916.
1,208,102.
Patented Dec. 12, 1916.
2 SHEETS—SHEET 1.
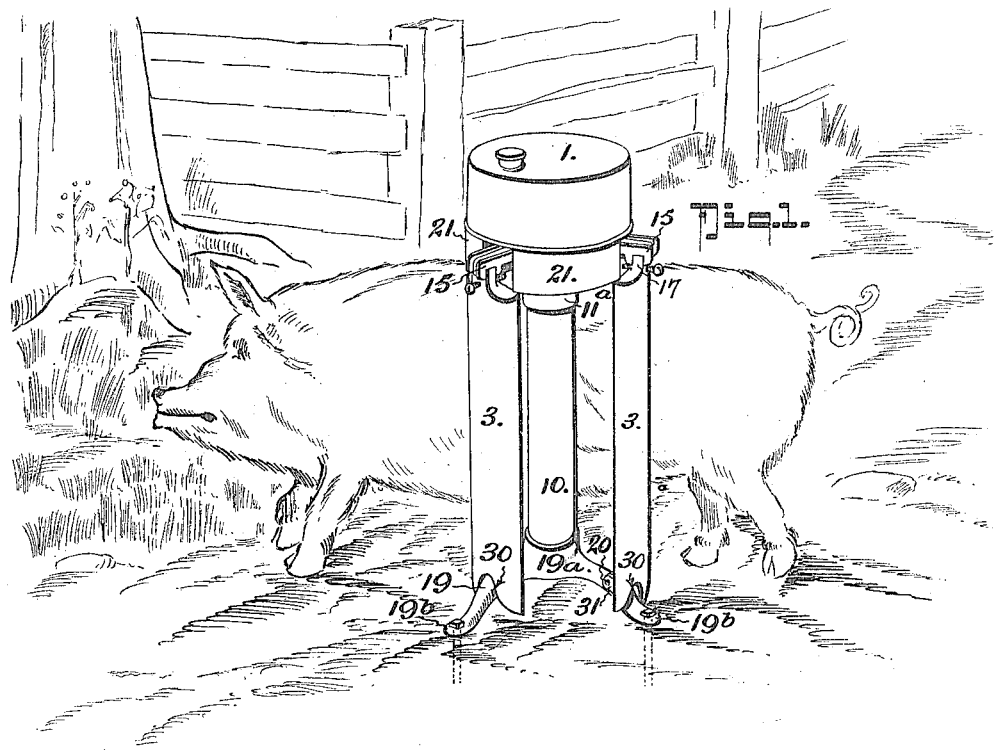
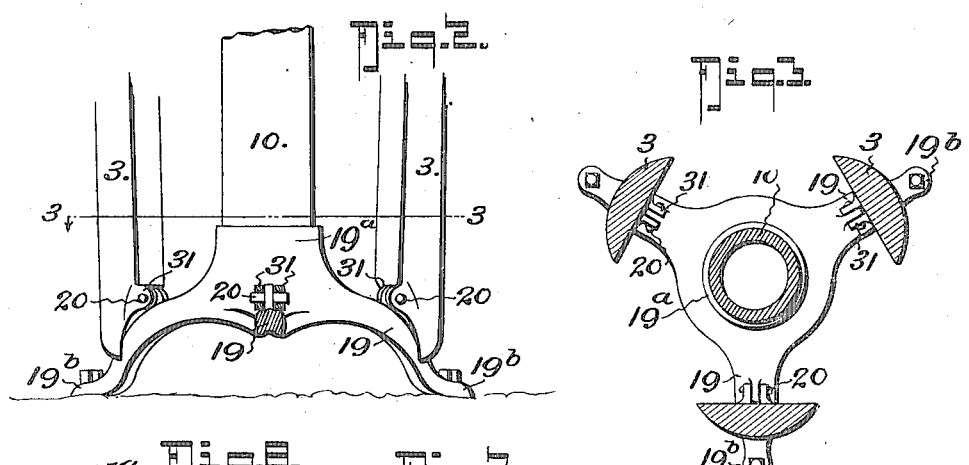
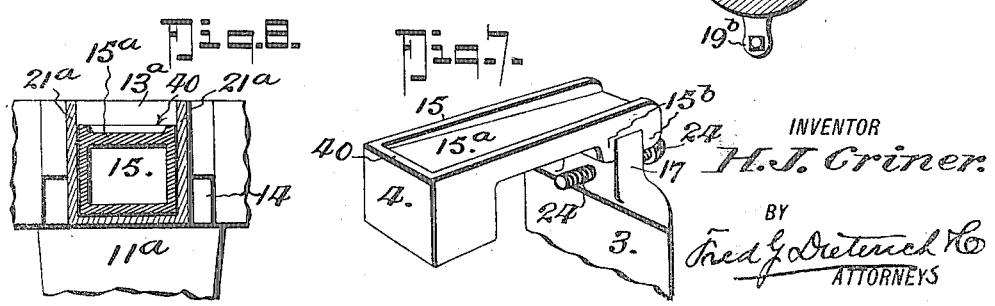
INVENTOR
H. J. Criner.
BY
Fred G. Dieterich & Co.
ATTORNEYS

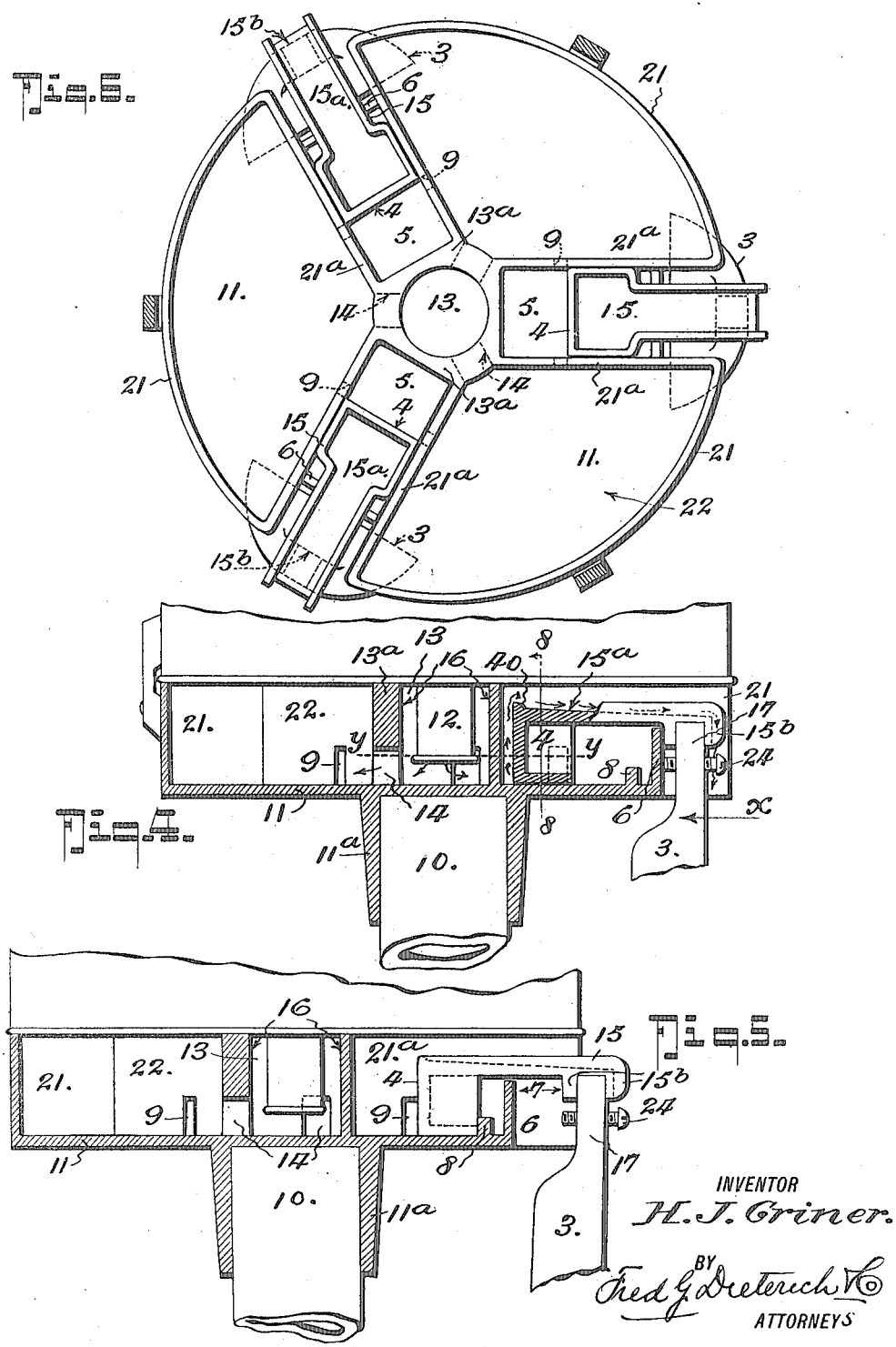

UNITED STATES PATENT OFFICE.

HARRY J. CRINER, OF BURLINGTON, IOWA, ASSIGNOR TO HAMPTON PLANTER COMPANY, OF LOMAX, ILLINOIS, A CORPORATION OF MINNESOTA.

HOG-OILER.

1,208,102. Specification of Letters Patent. Patented Dec. 12, 1916.

Application filed June 2, 1916. Serial No. 101,270.

*To all whom it may concern:*

Be it known that I, HARRY J. CRINER, residing at Burlington, in the county of Des Moines and State of Iowa, have invented a new and Improved Hog-Oiler, of which the following is a specification.

My invention has reference to means designed for applying and distributing insecticides and disinfectants to bodies of live stock as a preventive and cure for lice, mange, &c., and my said invention primarily has for its object to provide an appliance for the purpose stated of a simple and inexpensive construction that automatically operates to completely mix the liquid when the animal rubs against the distributing member or wall thereof, to thereby cause the medicinal properties to thoroughly mix with the liquid before the latter passes on to the wall or member against which the animal rubs.

Another object of my invention is to provide, in an appliance of the character stated, an improved construction of parts that includes means for quickly controlling the outfeed of the oil so as to provide for a larger or smaller quantity of the liquid insecticide, according to the sizes of the animals to be oiled, and in which the parts are so arranged that after each operation of "rubbing", the outflow of the liquid over the wall or member, against which the animals rub, is cut off, to thereby prevent waste of the said liquid.

With other objects in view that will hereinafter appear, my invention embodies the peculiar features of construction and the novel combination of parts that constitute my improved hog oiler, hereinafter described in detail, specifically pointed out in the appended claims and illustrated in the accompanying drawings, in which:

Figure 1 is a perspective view of my invention and the same illustrates the manner in which it is used. Fig. 2 is a vertical section of the base portion thereof. Fig. 3 is a horizontal section of the base portion taken on the line 3—3 on Fig. 2. Fig. 4 is a vertical section of the upper end of my invention, one of the rubbing walls or members being shown as forced inwardly by animal pressure, and the plunger member that coöperates therewith in the position for forcing out a charge of oil or insecticide to pass on to the said rubbing wall. Fig. 5 is a similar view, the rubbing wall or member being at the outermost or normal position as a new charge flows from the oil reservoir. Fig. 6 is a top plan view thereof, the reservoir being removed. Fig. 7 is a perspective view of one of the combined plunger and distributing members hereinafter specifically referred to, and Fig. 8 is a transverse section on the line 8—8 on Fig. 4.

In carrying out my invention I provide a post or standard 10, the lower end of which is fixedly held in a socketed base that includes leg portions 19 that radiate from the hub 19$^a$ and which includes foot portions 19$^b$, the latter, when my invention is applied for use, being suitably anchored to thereby rigidly hold the entire appliance against lateral strains thereon as the animal rubs thereagainst, as will hereinafter more fully appear.

11 is a circular cap plate that is horizontally mounted upon the upper end of the post 10, it having a pendent socket 11$^a$ that fits onto the said post, as is clearly shown in Figs. 4 and 5 of the drawings. The cap plate 11 includes annular flange segments 21 that merge with radial flanges or ribs 21$^a$, arranged in pairs, and whose inner ends merge with a solid central portion or boss 13$^a$ that has a circular liquid receiving chamber 13 into which the neck 12, pendent from the bottom of the closed liquid reservoir 1, extends, and the said neck, when the reservoir is supported on the central portion 13$^a$ and the segment flanges 21, projects down within a short distance of the cap plate 11, so as to provide for a liquid seal of the reservoir outlet when the parts are at a normal condition, as illustrated in Fig. 4.

As is best shown in Fig. 6, a plunger head 4 formed on the front end of a hollow casting, see Figs. 4 and 8, is sildably mounted between the radial flanges 21$^a$ and the upper end of the said casting forms a trough 15, whose bottom portion 15$^a$ inclines downwardly toward the periphery of the cap plate and terminates in pendent forked sockets 15$^b$ that receive the upper ends of the rubbing bars or members 3, presently again referred to.

The inner ends of the troughs 15 are formed by cross flanges 40 on the upper edge of plunger heads 4, held to slide between the pairs of flanges 21$^a$, as is best shown in Fig. 6, and when at the normal position, as shown, the said plungers 4 are located just outside of oil ports 9, in the flanges 21ª that communicate with the oil chambers 22 which receive the liquid that flows through the ports 14 in communication with the feeding chamber 13. A back wall 6 located between each pair of flanges 21ª is provided to prevent overflow of the liquid upon the return of the plunger.

7 designates a space between each back wall 6 and the adjacent upper end 17 of a rubbing member 3, and 24 is an adjustment screw that is mounted on the said end 17 and is adapted to be moved into engagement with the said back wall 6, it being understood that the said screw 24 permits of adjusting the distance or stroke of the plunger so as to supply the desired amount of oil or liquid wanted.

8 are lugs on the cap plate that serve as abutments to limit the back thrust of the plungers 4.

By referring again to Figs. 4 and 5, it will be seen that the wall 16 of the pocket into which the outflow neck of the reservoir discharges, extends up to the upper edge of the side flanges 21ª and the latter extend some distance above the top edges of the plungers and troughs that form coöperative portions of the said plungers.

The rubbing members 3, before referred to, are in the nature of horizontally curved segments whose lower ends are notched, as at 30, to fit over their corresponding leg members 19, to which they are hingedly connected by the stud pins 20 that pass through the inwardly extended ears 31 on the members 3 and through the legs 19, as is clearly shown in Fig. 3 of the drawings. By reason of pivoting the members 3 in the manner stated and shown, the normal tendency of the said members is to swing out by gravity to the position shown in Fig. 5.

By reason of the peculiar construction and coöperative arrangement of the several parts as described and shown and which constitute my improved oiler, the manner of the operation of the said oiler is best explained as follows: As the animal rubs against any one of the said bars 3, the bar is forced inwardly, see arrow x, and in doing so, it carries the combined plunger 4 and the trough 15 with it and as the said plunger moves inwardly, it closes off the ports 9 and in consequence compresses the liquid in the space 5, causes it to rise in such space and to pass up over the inner end of the trough 15 from whence it passes down the said trough 15 and feeds out over the open end of the said trough onto the outer surface of the rubbing member 3 and thereby reaches the rubbing animal. When the pressure on the member 3 is released, the said member gravitates back to the original position, see Fig. 5, and brings the plunger back into its original position, and thereby allows the liquid to again enter the space 5 and fill the latter to an oil level determined by the mouth 12 of the can or reservoir 1, as is shown in Figs. 4 and 5 of the drawings, on which the dotted line y represents the height of the liquid line, it being understood that the said liquid when thus resupplied to the space 5, upon return of the plunger 4, as stated, is fed from the reservoir mouth 12, as indicated in the drawings, into the space 13 and through the ports 14 to chamber 22, through the ports 9 and back into the spaces 5 from whence the charge was previously forced by the inside of the plunger.

In the drawings I have shown my improved oiler as provided with but three rubbing posts or members but I desire it understood my said improved oiler may embody one or any number of such rubbing elements to suit the required needs, it being understood there is the same rubbing construction in the rubbing element and the said element may be placed in any desired arrangement but preferably in circular form as shown.

From the foregoing description taken in connection with the accompanying drawings, the complete construction and the manner in which my invention is operatively applied for use and the advantages thereof will be readily apparent to those skilled in the art to which my invention relates.

It should be here stated that in my construction of hog oiler, there are neither valves nor spoons such as has heretofore been employed in hog oiler devices.

My construction and arrangement of parts is such that the working elements operate automatically, the liquid plunger thoroughly mixes the liquid at every stroke or plunge and hence any medicinal properties in the liquid will be thoroughly mixed with the liquid before the same goes over the surface of the rubbing member to be gathered by the animal that is rubbing. Again, in my construction the adjusting means before referred to are such that the operator can readily set the device to get just as much oil at each operation as he may desire, either for the smaller or larger size of animals. Again, in my construction of oiler, there is no waste of liquid as the plunger device closes the port for the oil when it is shoved over by the rubbing animal and should the latter lie down against the rubbing member 3, the oil or liquid reservoir remains closed until the animal gets up and away from the said member 3 and in releasing the latter, the same immediately goes back to its original position by reason of the overbalanced weight of the upper end thereof.

What I claim is:

1. In a hog oiler, a standard, a cap member on the standard, a liquid holder supported above the cap member, a liquid pocket in the cap member in communication with the holder, a combined plunger and trough slidably mounted in the liquid pocket, a rubbing member hingedly connected at the lower end to the standard to normally swing upwardly and adapted to swing inwardly by the animals rubbing thereagainst, the free end of the said member being connected with the combined plunger and trough whereby when the rubbing member is pushed inwardly the plunger will eject the liquid into the trough, said trough having its discharge end projected to deliver the liquid onto the outer face of the rubbing member.

2. In a hog oiler, a standard, a cap member mounted on the standard, a liquid holder supported above the cap member, a liquid pocket in the cap member in communication with the holder, means for simultaneously mixing and withdrawing liquid from the pocket, the said means being arranged for actuation by animals rubbing thereagainst and for conveying the mixed liquid to the bodies of such animals, the said means including a combined distributing trough and a plunger that operates against the liquid and forces it into the trough.

3. In a hog oiler, the combination of a base, a standard projected centrally from the base, a cap member mounted on the top of the standard, a liquid holding tank supported over the cap, the said cap member including a central pocket into which the liquid is received from the tank, a main liquid chamber in communication with the liquid pocket, a liquid space formed between a pair of vertical flanges that radiate from the central pocket, a hinged member arranged to be moved in one direction by animals rubbing thereagainst and which automatically returns to its normal position when pressure thereagainst is released, a trough slidably mounted between the pair of vertical flanges, said trough including a plunger head that mixes and forces the liquid in the liquid space up into the trough, the said trough being arranged to discharge the liquid gathered therein onto the hinged member and thereby convey the liquid to the body of the animal pressing against the said hinged member.

4. A hog oiler comprising a standard, a reservoir mounted thereon, a liquid pocket constantly in communication with the reservoir, a plunger operable in the liquid pocket, means normally held to withdraw the plunger to thereby draw a charge of liquid into the pocket, said means being arranged for actuation by the animals to move the plunger inwardly, said plunger having a trough in its upper face whose discharge end extends over the animal actuated means, all being arranged whereby when the plunger is forced inwardly under animal pressure, the mixed liquid is forced up into the trough and discharged onto the said animal engaged means, said means being arranged to return with the plunger to the normal position when the rubbing pressure of the animal ceases.

5. In a hog oiler, a standard, a cap member mounted on the standard, said member including a plurality of horizontally disposed liquid holding chambers and a central receiving space into which the liquid from the reservoir discharges, said central space being in communication with all of the chambers, a series of liquid holding spaces that radiate from the central space and which are in communication with the said liquid holding chambers, a plunger slidably mounted in each one of the series of liquid holding spaces, a rubbing member for each plunger, said rubbing member being pivotally supported at the lower end to normally swing outwardly, the said plungers each including a trough portion that discharges over the upper end of the rubbing members, said trough portions being connected to the upper ends of their respective rubbing members, all being arranged whereby when the rubbing members are forced inwardly their attached portions close off their respective liquid holding spaces from the liquid supply and force the liquid in such space up onto their respective distributing trough portions.

HARRY J. CRINER.

Copies of this patent may be obtained for five cents each, by addressing the "Commissioner of Patents, Washington, D. C."